(12) United States Patent
Majima

(10) Patent No.: US 6,662,551 B2
(45) Date of Patent: Dec. 16, 2003

(54) APPARATUS FOR CONTROLLING CATALYST TEMPERATURE AND METHOD FOR CONTROLLING CATALYST TEMPERATURE

(75) Inventor: Yoshihiro Majima, Inuyama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/091,556

(22) Filed: Mar. 8, 2002

(65) Prior Publication Data

US 2002/0124554 A1 Sep. 12, 2002

(30) Foreign Application Priority Data

Mar. 9, 2001 (JP) ......................................... 2001-065961

(51) Int. Cl.[7] ................................................. F01N 3/00
(52) U.S. Cl. ............................. 60/284; 60/274; 60/285; 123/339.11; 123/339.12
(58) Field of Search .......................... 60/274, 284, 285; 123/339.11, 339.12, 339.1

(56) References Cited

U.S. PATENT DOCUMENTS

| 5,492,094 A | * | 2/1996 | Cullen et al. ................. 60/285 |
| 5,950,419 A | * | 9/1999 | Nishimura et al. ............ 60/284 |
| 5,954,025 A | * | 9/1999 | Kanamaru et al. ...... 123/339.11 |
| 6,116,213 A | * | 9/2000 | Yasui et al. .................... 60/284 |
| 6,212,884 B1 | * | 4/2001 | Ohuchi et al. ................. 60/284 |
| 6,276,131 B1 | * | 8/2001 | Ueno et al. .................... 60/285 |

FOREIGN PATENT DOCUMENTS

| JP | 6-26432 | 2/1994 |
| JP | 6-14655 | 5/1994 |
| JP | 2929895 | 5/1999 |

\* cited by examiner

*Primary Examiner*—Thomas Denion
*Assistant Examiner*—Tu M. Nguyen
(74) *Attorney, Agent, or Firm*—Nixon & Vanderhye, PC

(57) ABSTRACT

A catalyst is warmed up by a rapid heating control that retards ignition timing and increases an intake air amount. Then the warm up is completed or a transmission is shifted to a drive range, the ignition timing is gradually advanced and the intake air amount is gradually decreased. Therefore, an engine speed is smoothly changed from the rapid heating control to the normal control without a torque shock. Additionally, a beginning of the advancing of the ignition timing is delayed by a predetermined delay time relative to a beginning of the decreasing of the intake air amount. The decreasing of the intake air amount prevents undesirable increase of the engine speed caused by the advancing of the ignition timing.

24 Claims, 7 Drawing Sheets

| NE (rpm) | 1500 | 1400 | 1350 | 1300 | 1250 | 1200 |
|---|---|---|---|---|---|---|
| DNE (rpm) | 50 | 100 | 150 | 200 | 250 | 300 |

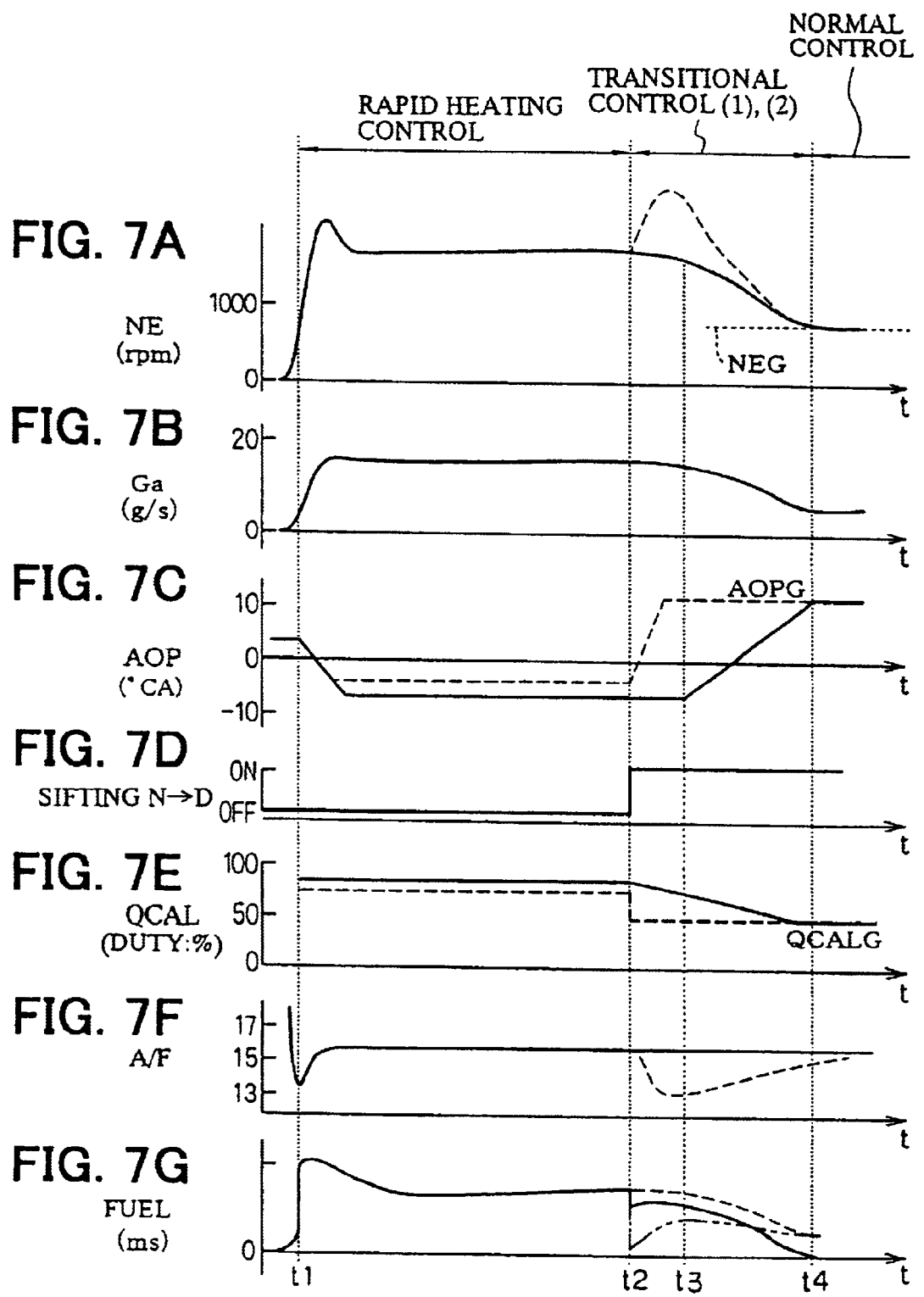

APPARATUS FOR CONTROLLING CATALYST TEMPERATURE AND METHOD FOR CONTROLLING CATALYST TEMPERATURE

CROSS REFERENCE TO RELATED APPLICATION

This application is based on Japanese Patent Application No. 2001-65961 filed on Mar. 9, 2001 the contents of which are incorporated herein by reference.

BACKGROUND OF THE INVENTION

1. Field of the Invention

The present invention relates to an apparatus for controlling a catalyst temperature of an engine and a method for controlling the catalyst temperature of the engine. More specifically, the present invention provides a transitional control between a rapid heating control and a normal control of the catalyst temperature.

2. Description of Related Art

The Japanese patent JP-B2-2929895 discloses a rapid heating control for a catalyst of an engine. In this control, ignition timing is retarded to increase an exhaust temperature, and an opening degree of an idle speed control valve (ISC valve) is widened to increase an engine speed. According to the control, since the retarded ignition timing prevents a rough idle, the catalyst is rapidly warmed up without the rough idle. Then, the control is quickly switched to a normal control for maintaining the catalyst temperature within an activated range.

In order to speed up a warm-up of the catalyst, it is proposed to increase a retarding degree of the ignition timing. However, the large retarding degree requires a large advancing change of the ignition timing that may cause a sudden torque-up when the rapid heating control is completed. Although the opening degree of the ISC valve should be decreased when the rapid heating control is completed, decreasing an intake air is not sufficient to suppress the torque-up caused by the ignition timing change since an air system of the engine usually has a greater delay in comparison to the ignition system. Further, relatively large amount of fuel is adhered on an intake passage and cylinders, hereinafter referred to as wet fuel or wet amount of fuel, during a cold starting of the engine where the rapid heating control is necessary. Therefore, an exhaust emission may get worse when the rapid heating control is completed since the wet fuel is introduced into the cylinders by an increased intake air.

SUMMARY OF THE INVENTION

It is an object of the present invention to provide an apparatus and a method which are capable of preventing the torque shock when the rapid heating control is completed.

It is another object of the present invention to provide an apparatus and a method which and a method which is capable of preventing the torque shock and lowering the exhaust emission when the rapid heating control is completed.

According to an embodiment of the present invention, an intake air amount is gradually changed from an increased amount under a rapid heating control to a normal amount under a normal control in a direction to decrease an engine torque. Simultaneously, ignition timing is also gradually changed from a retarded ignition timing under the rapid heating control to a normal ignition timing under the normal control in a direction to increase the engine torque. Therefore, the engine is smoothly operated without a torque shock, and is prevented from an emission caused by a sudden increase of fuel amount introduced by the sudden increased airflow.

It is preferable to provide a delay between the beginning of the intake air change and the beginning of the ignition timing change. The delay approaches a relatively quick engine response to the ignition timing and a relatively slow engine response to the intake air. Therefore, it is possible to reduce the torque shock.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIGS. 7A through 7G are graphs showing behavior of the engine according to the embodiment of the present invention.

DETAILED DESCRIPTION OF PREFERRED EMBODIMENTS

Figure 1:
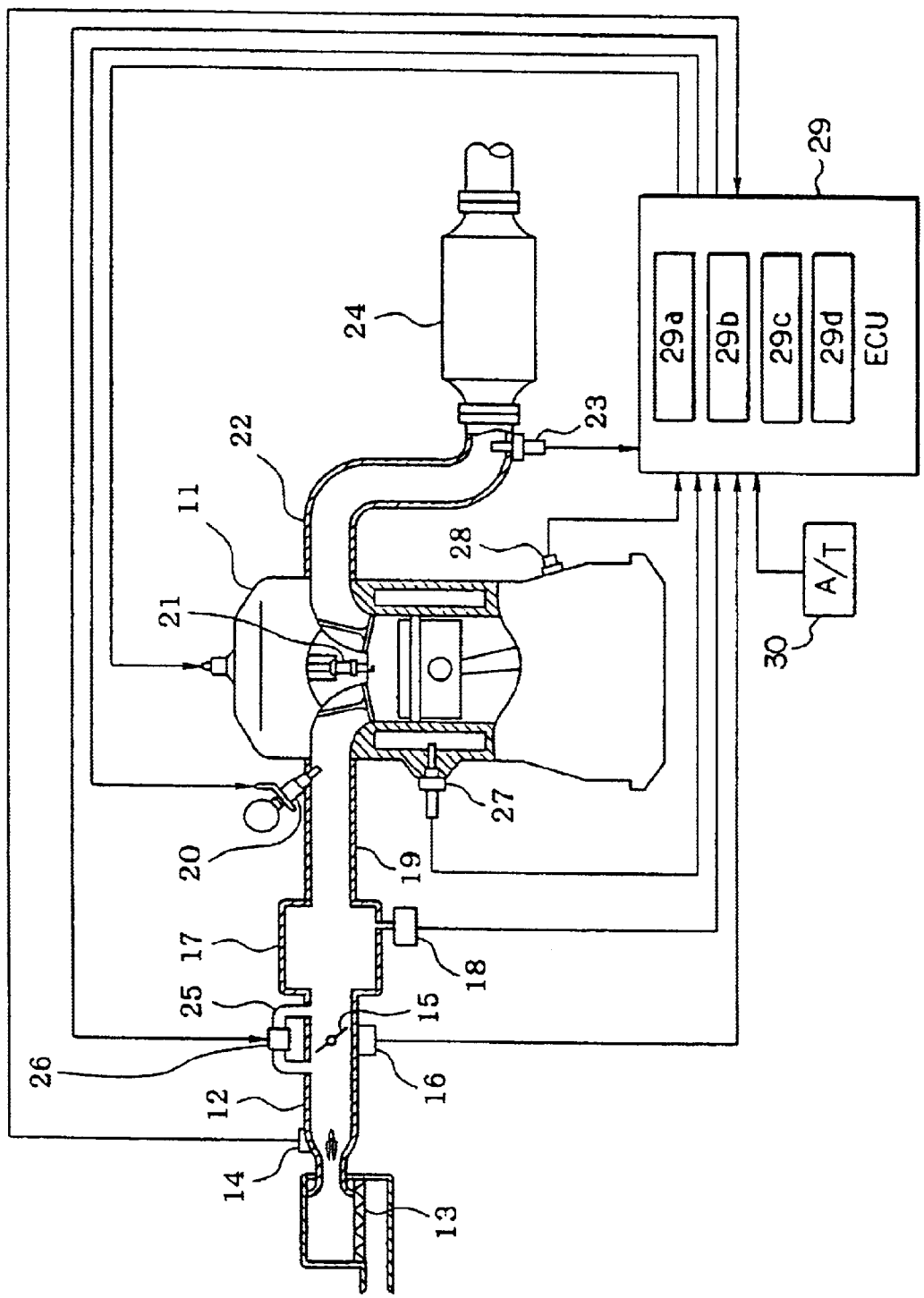
FIG. 1 is a block diagram of a control system for an engine according to an embodiment of the present invention.

FIG. 1 shows a general construction of an engine control system according to the embodiment. An internal combustion engine 11 has an intake passage 12. The intake passage 12 has an air cleaner 13 on an upstream end thereof. An airflow meter 14 for detecting an amount of airflow is disposed on a downstream side of the air cleaner 13. A throttle valve 15 for varying an opening degree of the intake passage is disposed on a downstream side of the airflow meter 14. The throttle valve 15 is linked and operated in accordance with an accelerator pedal that is operated by a driver of a vehicle. The throttle valve 15 is also equipped with an opening sensor 16 for detecting an opening degree of the throttle valve. A surge tank 17 is provided between the throttle valve 15 and an intake manifold 19 for distributing intake air to cylinders of the engine 11. A pressure sensor 18 is disposed on the surge tank 17 for detecting an intake pressure. Fuel injectors 20 are disposed on respective intake passages and supply fuel to the cylinders. Each fuel injector 20 injects fuel into the intake passage in response to an injection signal. Ignition devices 21 are respectively located on the cylinders. Each ignition device 21 has a spark plug, an ignition coil and an ignition circuit, and provides spark in a combustion chamber in response to an ignition signal. A bypass passage 25 is provided to communicate upstream and downstream sides of the throttle valve 15. An ISC valve 26 is disposed on the bypass passage 25 for varying an amount of bypassing air in accordance with an operating signal.

The engine 11 also has an exhaust passage 22. The exhaust passage 22 has a catalyst 24 that is a three mode catalyst or the like for decreasing CO, HC, NOx or the like in exhaust gas. An air-fuel ratio sensor 23 is disposed on the exhaust passage 22 at an upstream side of the catalyst 24. A linear type A/F sensor or an oxygen sensor may be used as the air-fuel ratio sensor 23 in the embodiment. The air-fuel ratio sensor 23 may detect an air-fuel ratio or a rich/lean condition of the exhaust gas and outputs a signal indicative thereof.

The engine 11 has a temperature sensor 27 for detecting a temperature of coolant water for the engine 11. The engine 11 also has an angular sensor 28 for detecting a rotating angle of a crankshaft and for outputting a signal indicative of an engine speed and an angular position. The system has an electronic control unit (ECU) 29. The ECU 29 is a microcomputer having a ROM memorizing predetermined programs. The ECU 29 inputs the signals from the sensors and controls actuators such as the fuel injectors 20, the ignition devices 21 and the ISC valve 26. The ECU 29 inputs a shift signal indicative of a shifting action to a drive range of an automatic transmission 30 from a neutral range or a parking range.

The ECU 29 provides a rapid heating control means 29a for increasing a temperature of the catalyst 24 to an active temperature range when the engine 11 is started in a cold condition by executing the program memorized in the ROM. In the rapid heating control, the ECU 29 provides retarded ignition timing relative to a normal condition of the engine 11. The retarded ignition timing increases an exhaust gas temperature and rapidly warms up the catalyst 24. In the rapid heating control, the ECU 29 also provides an increased opening degree of the ISC valve 26 relative to a normal idling condition of the engine 11. The increased opening degree of the ISC valve 26 increases the engine speed and increases a heat quantity of the exhaust gas. Therefore, the catalyst 24 can be rapidly heated and the engine 11 is prevented from a rough idling.

The ECU 29 further provides a transitional control means 29b in accordance with a condition and an operation of the engine 11. For instance, the ECU 29 provides the transitional control when a warm up of the catalyst 24 is completed by the rapid heating control, or the shift signal indicates shifting to the drive range while the rapid heating control is executed. In the above cases, the ECU 29 gradually and slowly changes the opening degree of the ISC valve 26 and the ignition timing to a normal value provided by a normal control. The ECU 29 gradually decreases the opening degree of the ISC valve 26, and gradually advances the ignition timing with a predetermined delay. The delay is determined in view of a response delay of the intake air system so that the engine simultaneously responses the change of the intake air amount and the change of the ignition timing. In this embodiment, the delay substantially corresponds to a response time between a change of the opening degree of the ISC valve 26 and a response of the engine speed.

In the case of a racing of the engine 11 while the rapid heating control, the ECU 29 quickly changes the opening degree of the ISC valve 26 and the ignition timing from the values provided by the rapid heating control to the values provided by the normal control. This control may allow a quick response of the engine speed in response to the racing operation by which the driver quickly accelerates the engine without load.

The ECU 29 further provides a normal control means 29c for maintaining the temperature of the catalyst 24 within an active range during the engine 11 runs. The above-described controls is provided by the programs as shown in FIGS. 2 through 6.

Rapid Heating Control

Figure 2:
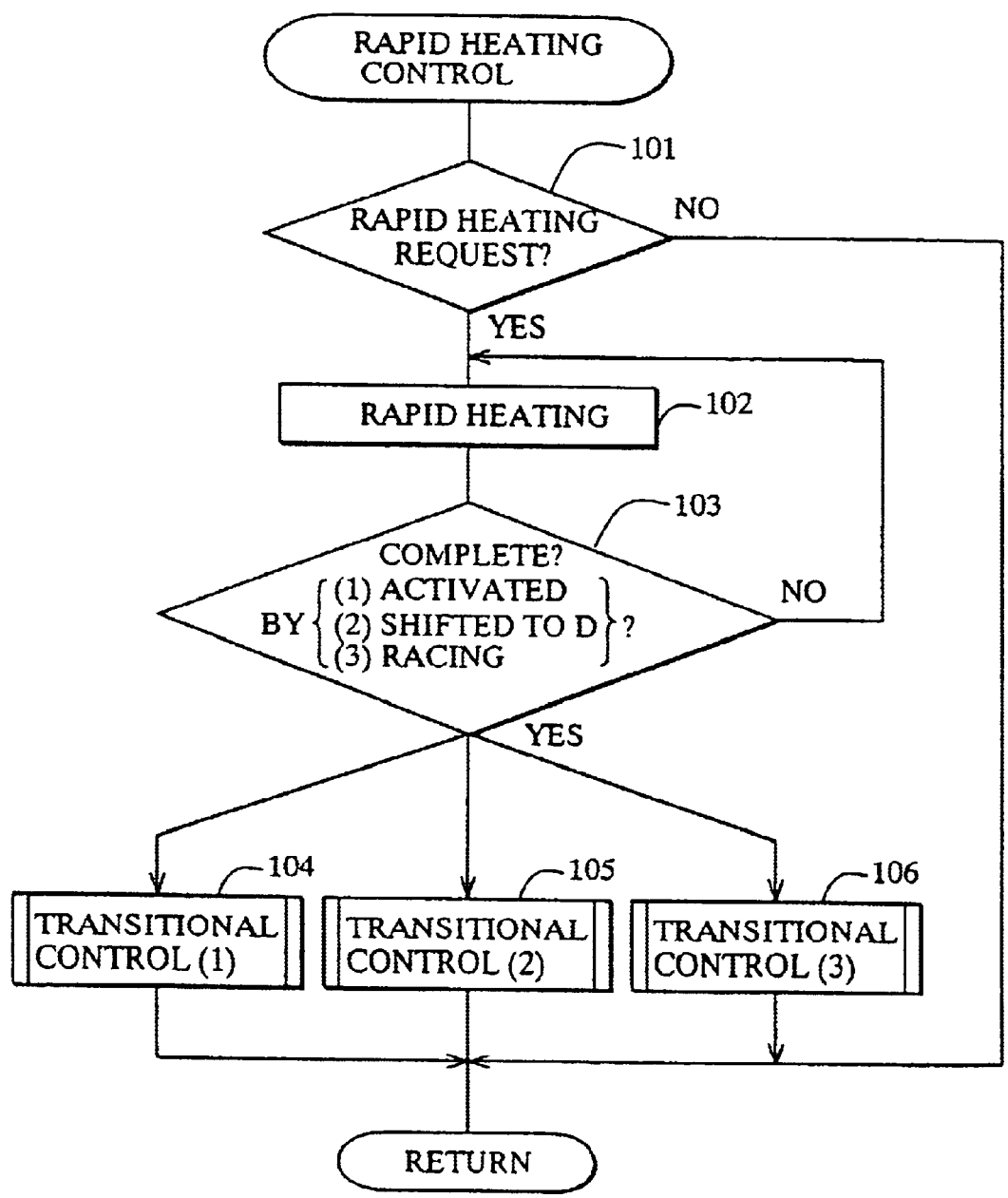
FIG. 2 is a flowchart showing a rapid heating control for a catalyst according to the embodiment of the present invention.

FIG. 2 shows a main routine for providing the rapid heating control. The routine begins when an ignition switch is turned on. In a step 101, the ECU 29 determines that whether the rapid heating control is requested or not. In this embodiment, if the temperature of the coolant detected by the sensor 27 is lower than a threshold, e.g. 50 degrees Celsius (° C.), and a fuel property is not heavy, the ECU 29 permits the rapid heating control. If the temperature or the fuel property doesn't meet the requirements, the ECU 29 jumps the following steps.

In a step 102, the ECU 29 controls the actuators so as to warm up the catalyst 24 rapidly. In this embodiment, the ECU 29 executes an ignition retard control, an idle up control, and a lean combustion control. In the retarded ignition control, the ignition timing of the ignition device 21 is retarded relative to ignition timing for a normal idling provided by the normal control means 29c. The retarded ignition timing may increase an exhaust gas temperature and accelerates a warming up of the catalyst 24. In an idle up control, the opening degree of the ISC valve 26 is increased relative to a target opening degree for the normal idling provided by the normal control means 29c. The increased opening degree allows an increased amount of bypass air, and increases the engine speed up to a higher speed than a target speed for the normal idling. Therefore, the increased engine speed contributes to keep the engine speed stable, and increases the heat quantity of the exhaust gas. In the lean combustion control, the ECU 29 controls the fuel injectors 20 to supply fuel so that the air-fuel ratio is maintained around the stoichiometric or a slightly lean value, e.g. 14.5 to 15.5 in the air-fuel ratio. This fuel control reduces an emission of HC during the rapid heating control, and prevents the exhaust emission from getting worse.

In a step 103, it is determined that the rapid heating control is completed or not. If predetermined conditions are satisfied, the ECU 29 determines a completion and proceeds to the transitional controls. For instance, in this embodiment, (1) the catalyst 24 is activated, (2) the transmission is shifted from neutral range to a drive (D) range, and (3) the driver accelerates the engine without load (Racing) are used as the condition.

The first condition (1) may be identified by measuring an elapsed time from an engine starting and determining whether the elapsed time reaches to a predetermined time or not. The predetermined time is a standard time for activating the catalyst from the engine starting. The condition (1) may be identified by determining whether an increased degree of the coolant temperature reaches to a predetermined value or not. The condition (1) may be identified by estimating the catalyst temperature based on at least one parameter indicative of the heat quantity such as the exhaust gas temperature and an accumulated amount of injected fuel from the engine starting, and determining whether the estimated temperature reaches to the active temperature or not. Further, the catalyst temperature directly detected may be used instead of the estimated temperature.

The second condition (2) may be identified by monitoring the signal from the automatic transmission 30.

Figures 5, 6:
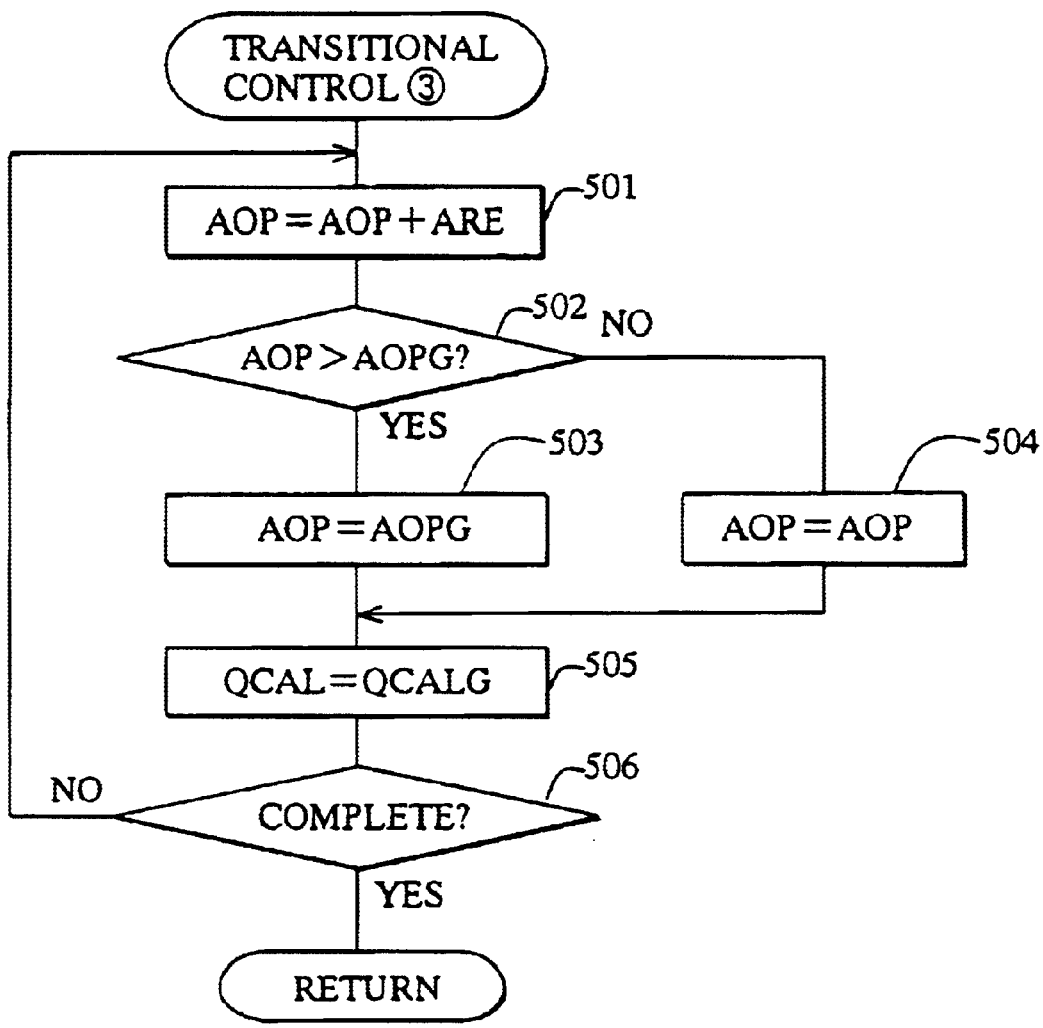
FIG. 5 is a flowchart showing a transitional control according to the embodiment of the present invention.
FIG. 6 is a map used in the transitional control according to the embodiment of the present invention.

The third condition (3) may be identified by determining whether the engine speed NE is higher than a predetermined value, e.g. 2000 r.p.m., or not. The condition (3) may be identified by determining whether a variation dNE of the engine speed NE is greater than a predetermined value, e.g. 100 r.p.m., or not. In this case, the predetermined value may be a fixed value or set in accordance with the engine speed NE as shown in FIG. 6. The condition (3) may be identified by determining whether the opening degree TH of the throttle valve 15 is greater than a predetermined degree, e.g. 5 degrees (°), or not. The condition (3) may be identified by determining a variation dTH of the opening degree TH is greater than a predetermined value, e.g. 2 degrees (°), or not. Further, the condition (3) may be identified by a combination of the above-described methods using the engine speed NE and the opening degree TH.

If all the conditions are not satisfied, the rapid heating control is continued. If any one of the conditions is satisfied, the routine proceeds to a step corresponding to the satisfied condition. In subsequent steps 104, 105 or 106, the ECU 29 switches the control method from the rapid heating control to the normal control through the transitional control. In this embodiment, the transitional control has two characteristics that are executed in accordance with operating situations of the engine that is indicated by the condition identified in the step 103. If the condition (1) is satisfied, the routine proceeds to the step 104, and the ECU 29 executes a routine shown in FIGS. 3 and 4. If the condition (2) is satisfied, the routine proceeds to the step 105, and the ECU 29 executes the routine shown in FIGS. 3 and 4. In the steps 104 and 105, the ECU 29 executes a gradual control for changing signal levels outputted from the ECU 29 to normal levels gradually. If the condition (3) is satisfied, the routine proceeds to the step 106, and the ECU 29 executes a routine shown in FIG. 5. In the step 106, the ECU 29 executes a quick control for changing signal levels outputted from the ECU 29 to normal levels quickly.

Transitional Controls

Figure 3:
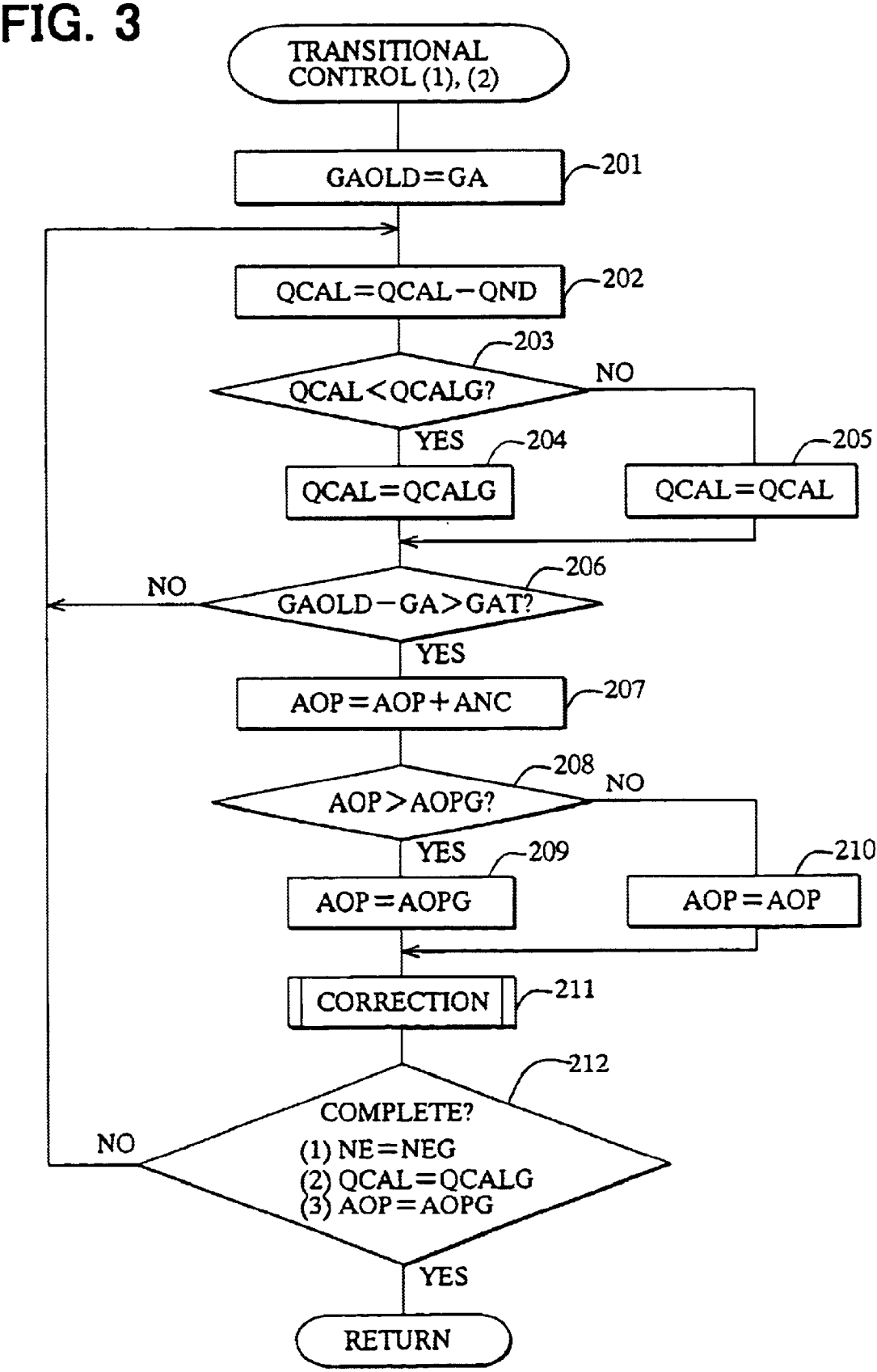
FIG. 3 is a flowchart showing a transitional control according to the embodiment of the present invention.
Figure 4:
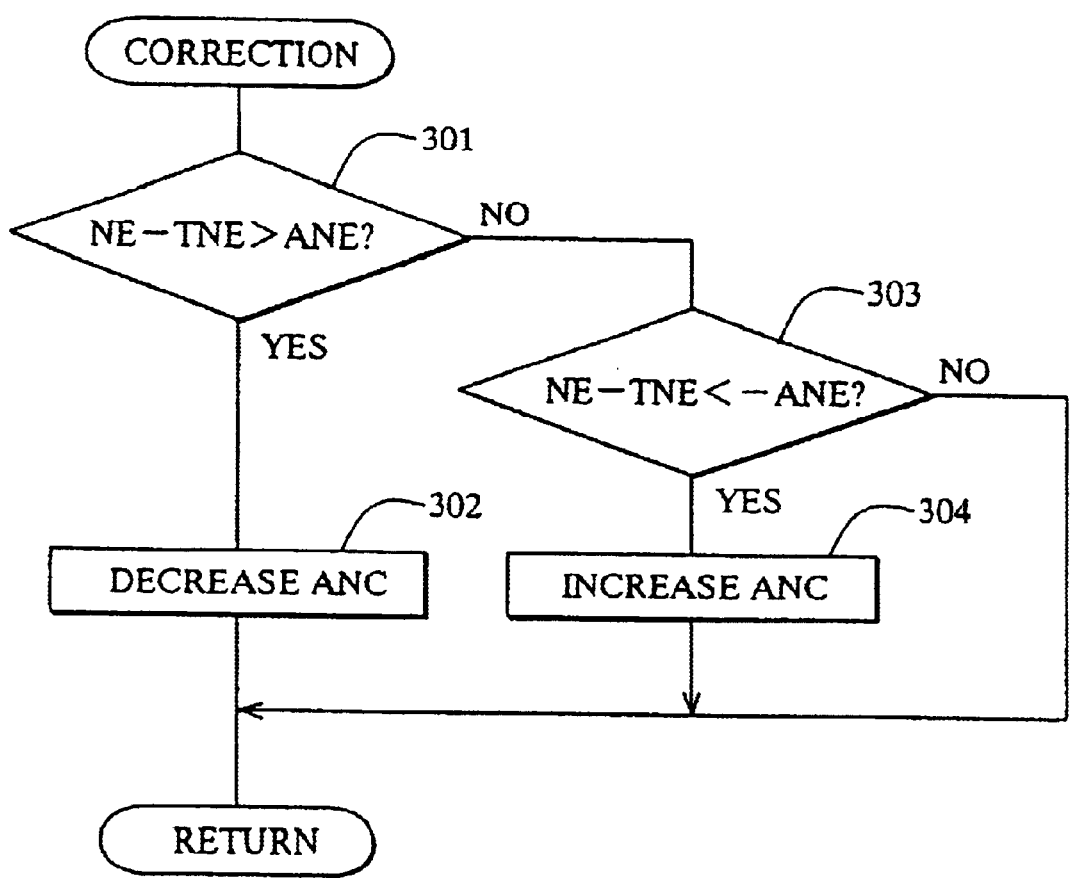
FIG. 4 is a flowchart showing a transitional control according to the embodiment of the present invention.

In the step 104, the gradual control is executed as shown in FIGS. 3 and 4. In a beginning of the routine, in step 201, the ECU 29 inputs the present amount GA of the intake air, and stores the present amount GA as an initial amount GAOLD. This initial amount GAOLD is useful to determine a delay time in accordance with the amount of the intake air.

In a step 202, the opening degree QCAL of the ISC valve 26 is decreased by a predetermined amount QND. For instance, the amount QND may be obtained by a ratio, e.g. the 0.01%, of the present degree QCAL.

In a step 203, it is determined that whether the opening degree QCAL reaches to a target degree QCALG for the normal idling. If the opening degree QCAL has not yet reached to the target degree QCALG, the ECU 29 uses the opening degree QCAL for controlling the ISC valve 26 in a step 205. If the opening degree QCAL has reached to the target degree QCALG, the ECU 29 uses the target opening degree QCALG for controlling the ISC valve 26 in a step 204. That is, the target degree QCALG defines a lower limit of the opening degree. The opening degree of the ISC valve 26 is gradually decreased as the steps 204 and 205 are repeatedly executed.

In a step 206, a decreased amount (GAOLD−GA) of the intake air is calculated, and it is determined whether the decreased amount reaches to a predetermined amount GAT, e.g. 1 g. The routine returns to the step 202 till the decreased amount reaches to the predetermined amount. As a result, the ignition control executed by the following steps is delayed.

If the decreased amount reaches to the predetermined amount, the routine proceeds to a step 207. In the step 207, the ECU 29 advances the ignition timing AOP by a predetermined degree ANC, e.g. 0.05 degrees of crank angle (° CA). In a subsequent step 208, it is determined that whether the ignition timing AOP reaches to a target degree AOPG for the normal idling or not. If the ignition timing AOP has not yet reached to the target degree AOPG, the ECU 29 uses the ignition timing AOP for controlling the ignition devices 21 in a step 210. If the ignition timing AOP has reached to the target degree AOPG, the ECU 29 uses the target degree AOPG for controlling the ignition devices 21 in a step 209. That is, the target degree AOPG defines an advancing limit of the ignition timing. The ignition timing is gradually advanced as the steps 209 and 210 are repeatedly executed.

In a step 211, the ECU 29 executes a correction program as shown in FIG. 4. The ECU 29 corrects the predetermined degree ANC so as to keep behavior of the engine rotation within a predetermined desirable target behavior range. In the step 211, the ECU 29 executes the routine for keeping the engine speed within a predetermined range.

In a step 301, it is determined that whether a difference between the present engine speed NE and a target engine speed TNE is greater than a predetermined value ANE, e.g. 100 r.p.m, or not. In this embodiment, the predetermined value ANE is obtained by looking up a map or calculating a predetermined functional expression that are defined in accordance with an elapsed time from the completion of the rapid heating control. The map or functional expression may be determined so as to reproduce a desirable change of the engine speed after the completion of the rapid heating control up to a beginning of the normal control. The desirable change can be determined and obtained by experimentations or simulations. The map or functional expression is stored in the ROM in the ECU 29. The map or functional expression is determined so as to converge the engine speed into a normal target engine speed NEG for the normal idling.

If the difference (NE−TNE) is greater than the predetermined value ANE in the step 301, the predetermined degree ANC is decreased to slow down an advancing speed of the ignition timing so as to approach the engine speed NE to the target engine speed TNE in a step 302. If the difference (NE−TNE) is not greater than the predetermined value ANE in the step 301, the ECU 29 determines that whether the difference (NE−TNE) is smaller than a predetermined value −ANE or not in a step 303. If the difference (NE−TNE) is smaller than the predetermined value −ANE, the predetermined degree ANC is increased to speed up the advancing speed of the ignition timing so as to approach the engine speed NE to the target engine speed TNE in a step 304. Otherwise, the predetermined degree ANC is maintained.

As a result, the predetermined degree ANC for advancing the ignition timing from the completion of the rapid heating control is corrected so as to change the engine speed gradually and to follow a desirable characteristic.

Referring to FIG. 3 again, in a step 212, the ECU 29 determines that the gradual control is completed or not. In this embodiment, (1) the engine speed NE reaches to the normal target engine speed NEG, (2) the opening degree QCAL reaches to the target degree QCALG, and (3) the ignition timing AOP reaches to the target ignition timing AOPG are used as the conditions. If any one of the conditions is not satisfied in step 212, the routine returns to the step 202.

As a result, the amount of the intake air is gradually changed from an increased amount under the rapid heating control to a normal amount under the normal control in a direction to decrease an engine torque. Simultaneously, the ignition timing is also gradually changed from the retarded ignition timing under the rapid heating control to the normal ignition timing under the normal control in a direction to increase the engine torque. Therefore, the engine 11 is smoothly operated without a torque shock, and is prevented from an emission caused by a sudden increase of fuel amount introduced by the sudden increased airflow. Additionally, there is a delay between the beginning of the intake air change and the beginning of the ignition timing change. Therefore, the torque shock can be prevented. Further, the changing speed of the ignition timing is changed by correcting the changing degree, so that the engine speed follows the desirable characteristic. Therefore, the engine speed smoothly changes during the gradual control.

Further, the ECU 29 has a fuel control means 29d for controlling a fuel amount. Specifically, the fuel control means 29d decreases a fuel amount during the gradual control. In this embodiment, the ECU 29 decreases the fuel amount supplied by the fuel injectors 20 by a predetermined amount by shortening an injection period by a predetermined period, e.g. 10%. FIG. 7G shows a decreased fuel amount by a solid line, and a normal amount almost in proportion to the amount of the intake air by a dashed line. Alternatively, it may be utilized to provide a greater decreasing amount in response to the completion of the rapid heating control and to suppress the decreasing amount as the time elapses. As a result, it is possible to suppress a deviation of the air-fuel ratio during the gradual control.

Referring to FIG. 2 again, in the step 105, the same routine to FIGS. 3 and 4 is executed. Therefore, if the transmission is shifted from the neutral position to the drive position, the engine 11 is smoothly operated from the rapid heating control to the normal control and is prevented from undesirable torque shocks.

In the step 106, the ECU 29 executes the routine as shown in FIG. 5. This is the transitional control (3) that is activated when the driver accelerates the engine speed, that is the racing operation.

In a step 501, the ECU 29 advances the ignition timing by a predetermined degree ARE. The predetermined degree ARE is set greater than the predetermined degree ANC in the step 207. In the embodiment, the ARE is 0.1 degrees of crank angle (° CA).

In a step 502, it is determined that whether the ignition timing AOP reaches to a target degree AOPG for the normal idling. If the ignition timing AOP has not yet reached to the target degree AOPG, the ECU 29 uses the ignition timing AOP for controlling the ignition devices 21 in a step 504. If the ignition timing AOP has reached to the target degree AOPG, the ECU 29 uses the target degree AOPG for controlling the ignition devices 21 in a step 503. That is, the target degree AOPG defines an advance limit. The ignition timing is gradually but more quickly advanced as the steps 503 and 504 are repeatedly executed. The ignition timing is quickly advanced relative to the transitional control (1) and (2) described above.

In a step 505, the opening degree QCAL is switched to the target opening degree QCALG. Therefore, the intake air amount is simultaneously changed with the ignition timing. Additionally, in this embodiment, the intake air amount is quickly changed relative to the ignition timing. In a step 506, the ECU 29 determines that the quick control is completed or not. In this embodiment, (1) the opening degree QCAL reaches to the target degree QCALG, and (2) the ignition timing AOP reaches to the target ignition timing AOPG are used as the conditions. If any one of the conditions is not satisfied in step 506, the routine returns to the step 501.

As a result, if the engine 11 is accelerated as the racing during the rapid heating control, the ECU 29 immediately switches the opening degree of the ISC valve from the increased degree to the normal degree, and gradually but more quickly advances the ignition timing relative to the gradual control described above.

FIGS. 7A through 7G show control example of the embodiment. The rapid heating control begins at t1 after the engine 11 is started. Then, the ignition timing AOP is gradually retarded to the retarded degree to increase the exhaust gas temperature. In this embodiment, the ignition timing AOP is retarded over a usual ignition timing indicated by a dotted line in FIG. 7C. The opening degree QCAL of the ISC valve 26 is fixed during the rapid heating control as shown in FIG. 7E, but is higher than a usual degree indicated by a dotted line in FIG. 7E. Therefore, the intake air amount Ga is almost proportional to the engine speed NE as shown in FIGS. 7A and 7B. In the very beginning of the rapid heating control, the fuel amount is slightly increased as shown in FIG. 7G, therefore the air-fuel ratio deviates to a rich side in a short time as shown in FIG. 7F. After the engine speed NE is stabilized, the air-fuel ratio is kept on a slightly lean value as shown in FIG. 7F.

Then, in a timing t2, it is detected that the catalyst 24 is activated or the transmission 30 is shifted from the neutral range to the drive range. If the ECU 29 quickly advances the ignition timing and decreases the opening degree as shown in FIGS. 7C and 7E by the dotted lines, the engine speed NE and the air-fuel ratio may response as shown in FIGS. 7A and 7F by the dotted lines. However, in this embodiment, the opening degree QCAL is gradually decreased to the target degree QCALG as shown in FIG. 7E. The ignition timing AOP is delayed until the timing t3 where the intake air amount begins lowering. Further, the ignition timing AOP is gradually increased to the target degree AOPG. As a result, the engine speed NE is gradually and smoothly decreased without the torque shock.

In this embodiment, an amount of air introduced into the cylinder is gradually decreased, and the ignition timing is also gradually advanced in accordance with a decreasing speed of the amount of air introduced into the cylinder. Therefore, a decreasing air amount suppresses an increase of the engine speed caused by an advancing ignition timing. It is possible to use a retarded ignition timing during the rapid heating control since the torque shock is sufficiently suppressed. Additionally, it is possible to prevent the emission from getting worse since the engine speed smoothly transits to the normal target engine speed NEG.

Further, in this embodiment, the advancing speed of the ignition timing is corrected to follow the desirable engine speed behavior. Therefore, the engine speed NE smoothly converges to the normal target engine speed NEG.

Further, in this embodiment, the fuel amount is decreased during the transitional control as shown in FIG. 7G. Therefore, it is possible to reduce a deviation of the air-fuel ratio since the fuel amount may be decreased to follow the intake air amount.

Alternatively, the fuel control means 29d corrects or feedback controls the fuel amount so that the air-fuel ratio is maintained approximately the stoichiometric value after the catalyst 24 is activated. According to the alternative embodiment, it is possible to keep the air-fuel ratio within an effective window of the catalyst 24 and to improve the emission.

Figure 8A:
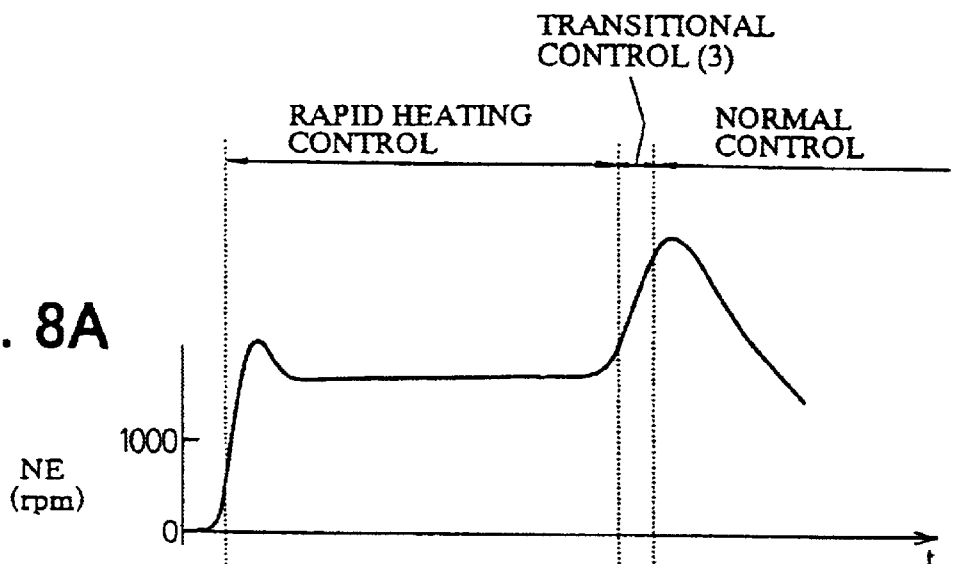
FIGS. 8A through 8C are graphs showing behavior of the engine according to the embodiment of the present invention.
Figure 8B:
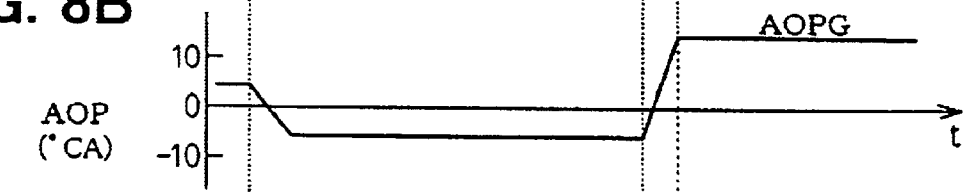
Figure 8C:
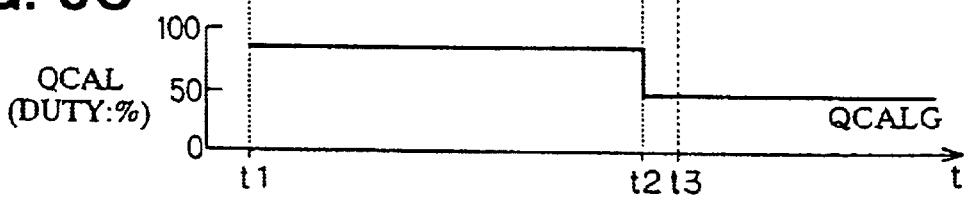

FIGS. 8A through 8C show control example of the embodiment. The rapid heating control begins at t1 and is executed until a timing t2 as well as the FIGS. 7A, 7C and 7E. Then, in the timing t2, the racing is detected. In this embodiment, the opening degree QCAL is immediately decreased to the target degree QCALG as shown in FIG. 8C. The ignition timing AOP is gradually but more quickly increased to the target degree AOPG as shown in FIG. 8B. The ignition timing AOP is quickly advanced in comparison to the transitional control (1) and (2) described above. The transitional control (3) is completed at a timing t3 where the ignition timing AOP reaches to the target degree AOPG.

According to the embodiment, it is possible to increase the engine speed immediately in response to the drivers acceleration. Further, it is possible to prevent the catalyst 24 from over-temperature deterioration since the quickly advanced ignition timing may decrease the exhaust gas temperature quickly and the immediately decreased opening degree reduces an amount of exhaust gas.

Alternatively, the transitional control (3) shown in FIG. 5 may be activated when the racing is detected and a variation of the engine speed NE is higher than a predetermined value. If the engine speed NE already responses to the racing operation of the driver, the driver may not have uncomfortable feeling or strange feeling even the torque shock is generated by the quick advance and the quick decrease of the intake air.

Further, if the variation of the engine speed NE is lower than the predetermined value that indicates a relatively slow racing operation, the ECU 29 may advance the ignition timing first so that the variation of the engine speed is in a predetermined range. Then the ECU 29 may switches the opening degree of the ISC valve to the normal control. According to the alternative embodiment, it is possible to change the engine speed relatively slow in response to the variation of the engine speed that reflects the driver's acceleration. Therefore, it is possible to reduce the uncomfortable feeling or strange feeling.

Further, the ISC valve 26 can be replaced by an electronic controllable throttle valve system that has a motor for operating the throttle valve. In the case of above, the throttle valve controls the intake air amount.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for controlling a catalyst temperature of an engine, comprising:
    rapid heating control means for retarding an ignition timing and increasing an intake air amount to accelerate a warming up of the catalyst;
    normal control means for controlling the ignition timing and the intake air amount after the rapid heating control means; and
    gradual control means for changing values provided by the rapid heating control means to values provided by the normal control means, wherein the gradual control means advances the ignition timing gradually and decreases the intake air amount simultaneously and gradually, and said gradual control means delays a beginning of the advancing for the ignition timing by a delay time of an intake air system relative to a beginning of the decreasing for the intake air amount.

2. The apparatus for controlling the catalyst temperature of the engine claimed in claim 1, further comprising detecting means for detecting an activation of the catalyst and for activate the gradual control means.

3. The apparatus for controlling the catalyst temperature of the engine claimed in claim 1, further comprising detecting means for detecting a shifting of a transmission to a drive range and for activating the gradual control means.

4. The apparatus for controlling the catalyst temperature of the engine claimed in claim 1, further comprising a correcting means for correcting an advancing speed of the ignition timing so that a behavior of the engine speed follows a desirable behavior during the gradual control means is activated.

5. The apparatus for controlling the catalyst temperature of the engine claimed in claim 1, further comprising a fuel decreasing means for decreasing a fuel amount during the gradual control means is activated.

6. The apparatus for controlling the catalyst temperature of the engine claimed in claim 1, further comprising fuel control means for controlling a fuel amount so that an air-fuel ratio is kept approximately the stoichiometric value during the gradual control means is activated.

7. The apparatus for controlling the catalyst temperature of the engine claimed in claim 1, further comprising racing detecting means for detecting a racing of the engine by monitoring at least one of the engine speed and an opening degree of the throttle valve, and quick control means activated instead of the gradual control means when the racing is detected, for changing the ignition timing and the intake air amount quickly from values provided by the rapid heating control means to values provided by the normal control means.

8. The apparatus for controlling the catalyst temperature of the engine claimed in claim 7, wherein the quick control means is activated when the racing is detected and a variation of the engine speed is greater than a predetermined value.

9. The apparatus for controlling the catalyst temperature of the engine claimed in claim 8, wherein the quick control means switches the intake air amount to a value provided by the normal control means after advancing the ignition timing so as to decrease the variation of the engine speed lower than a predetermined variation when the racing is detected and the variation of the engine speed is lower than a predetermined value.

10. A method for controlling a catalyst temperature of an engine, the method comprising:
    accelerating a warming up of the catalyst by retarding an ignition timing and increasing an intake air amount;
    controlling the ignition timing and the intake air amount subsequent to the accelerating step; and
    changing values gradually from values provided in the accelerating step to values provided in the controlling step by advancing the ignition timing gradually, and decreasing the intake air amount simultaneously and gradually, wherein a beginning of the advancing for the ignition timing is delayed by a delay time of an air intake system relative to a beginning of the decreasing for the air intake amount.

11. The method for controlling the catalyst temperature of the engine claimed in claim 10, the method further comprising the step of detecting an activation of the catalyst, wherein the changing step begins in response to the detection of the activation.

12. The method for controlling the catalyst temperature of the engine claimed in claim 10, the method further comprising the step of detecting a shifting of a transmission to a drive range, wherein the changing step begins in response to the detection of the shifting.

13. The method for controlling the catalyst temperature of the engine claimed in claim 10, the method further comprising the step of correcting an advancing speed of the ignition timing so that a behavior of the engine speed follows a desirable behavior during the changing step.

14. The method for controlling the catalyst temperature of the engine claimed in claim 10, the method further comprising the step of decreasing a fuel amount during the changing step.

15. The method for controlling the catalyst temperature of the engine claimed in claim 10, the method further comprising the step of controlling a fuel amount so that an air-fuel ratio is kept approximately the stoichiometric value during the changing step.

16. The method for controlling the catalyst temperature of the engine claimed in claim 10, the method further comprising the steps of:

detecting a racing of the engine by monitoring at least one of the engine speed and an opening degree of the throttle valve; and changing values quickly from values provided in the accelerating step to values provided in the controlling step by advancing the ignition timing quickly, and decreasing the intake air amount simultaneously and quickly when the racing is detected.

17. The method for controlling the catalyst temperature of the engine claimed in claim 16, the method further comprising the step of detecting a variation of the engine speed, wherein the quickly changing step is activated when the racing is detected and the variation is greater than a predetermined value.

18. The method for controlling the catalyst temperature of the engine claimed in claim 17, the method further comprising the step of wherein the quickly changing step switches the intake air amount to a value provided by the subsequent controlling step after advancing the ignition timing so as to decrease the variation of the engine speed lower than a predetermined variation when the racing is detected and the variation of the engine speed is lower than a predetermined value.

19. An apparatus for controlling a catalyst temperature of an engine, comprising:

rapid heating control means for retarding an ignition timing and increasing an intake air amount to accelerate a warming up of the catalyst;

normal control means for controlling the ignition timing and the intake air amount after the rapid heating control means;

gradual control means for changing values provided by the rapid heating control means to values provided by the normal control means, wherein the gradual control means advances the ignition timing gradually and decreases the intake air amount simultaneously and gradually;

racing detecting means for detecting a racing of the engine by monitoring at least one of the engine speed and an opening degree of the throttle valve; and quick control means activated instead of the gradual control means when the racing is detected, for changing the ignition timing and the intake air amount quickly from values provided by the rapid heating control means to values provided by the normal control means.

20. The apparatus for controlling the catalyst temperature of the engine claimed in claim 19, wherein the quick control means is activated when the racing is detected and a variation of the engine speed is greater than a predetermined value.

21. The apparatus for controlling the catalyst temperature of the engine claimed in claim 20 wherein the quick control means switches the intake air amount to a value provided by the normal control means after advancing the ignition timing so as to decrease the variation of the engine speed lower than a predetermined variation when the racing is detected and the variation of the engine speed is lower than a predetermined value.

22. A method for controlling a catalyst temperature of an engine, the method comprising:

accelerating a warming up of the catalyst by retarding an ignition timing and increasing an intake air amount;

controlling the ignition timing and the intake air amount subsequent to the accelerating step;

changing values gradually from values provided in the accelerating step to values provided in the controlling step by advancing the ignition timing gradually, and decreasing the intake air amount simultaneously and gradually;

detecting a racing of the engine by monitoring at least one of the engine speed and an opening degree of the throttle valve; and changing values quickly from values provided in the accelerating step to values provided in the controlling step by advancing the ignition timing quickly, and decreasing the intake air amount simultaneously and quickly when the racing is detected.

23. The method for controlling the catalyst temperature of the engine claimed in claim 22, further comprising:

detecting a variation of the engine speed, wherein the quickly changing step is activated when the racing is detected and the variation is greater than a predetermined value.

24. The method for controlling the catalyst temperature of the engine claimed in claim 23, wherein the quickly changing step switches the intake air amount to a value provided by the subsequent controlling step after advancing the ignition timing so as to decrease the variation of the engine speed lower than a predetermined variation when the racing is detected and the variation of the engine speed is lower than a predetermined value.

\* \* \* \* \*